US006422020B1

(12) United States Patent
Rice

(10) Patent No.: US 6,422,020 B1
(45) Date of Patent: Jul. 23, 2002

(54) CAST HEAT EXCHANGER SYSTEM FOR GAS TURBINE

(75) Inventor: Edward C. Rice, Indianapolis, IN (US)

(73) Assignee: Allison Advanced Development Company, Indianapolis, IN (US)

(*) Notice: Subject to any disclaimer, the term of this patent is extended or adjusted under 35 U.S.C. 154(b) by 0 days.

(21) Appl. No.: 09/523,815

(22) Filed: Mar. 13, 2000

(51) Int. Cl.⁷ .......................... F02C 7/141; F02C 7/224
(52) U.S. Cl. .......................................... 60/730; 60/736
(58) Field of Search ..................... 60/39.07, 39.511, 60/730, 736

(56) References Cited

U.S. PATENT DOCUMENTS

| | | | | |
|---|---|---|---|---|
| 2,717,581 A | * | 9/1955 | Edwards ........................ | 60/730 |
| 2,907,170 A | * | 10/1959 | Zadnik ........................ | 60/39.07 |
| 3,134,536 A | | 5/1964 | Adams | |
| 3,733,816 A | | 5/1973 | Nash et al. ................ | 60/39.28 R |
| 3,734,639 A | | 5/1973 | Short ........................... | 415/114 |
| 3,800,868 A | * | 4/1974 | Berkowitz et al. ........... | 165/152 |
| 3,874,168 A | | 4/1975 | Toure ........................ | 60/39.28 R |
| 4,012,912 A | | 3/1977 | Eskeli .......................... | 60/682 |
| 5,123,242 A | | 6/1992 | Miller | |
| 5,203,163 A | | 4/1993 | Parsons | |
| 5,697,208 A | * | 12/1997 | Glezer et al. .............. | 60/39.07 |
| 5,722,241 A | | 3/1998 | Huber | |

FOREIGN PATENT DOCUMENTS

EP           547641      *    6/1993

* cited by examiner

*Primary Examiner*—Louis J. Casaregola
(74) *Attorney, Agent, or Firm*—Woodard, Emhardt, Naughton Moriarty & McNett

(57) ABSTRACT

A cast heat exchanger, having an inlet and an outlet and defining an internal passage therebetween, includes a wall structure disposed within the internal passage that defines a series of interconnected chambers through which a cooling medium flows in a serpentine path. The outer surface of the heat exchanger is covered with pin fins that transfer heat away from the hot working medium flowing over the pin fins and into the cooling medium within the chambers of the heat exchanger.

21 Claims, 4 Drawing Sheets

CAST HEAT EXCHANGER SYSTEM FOR GAS TURBINE

This invention was made with U.S. Government support under contract number F33615-94-C-2482 and the U.S. Government may have certain rights in the invention.

BACKGROUND OF THE INVENTION

This invention relates generally to heat exchangers placed within gas turbine engines. More particularly, the present invention relates to a heat exchanger having an internal passageway and being disposed within the fluid flow path prior to the combustor. Although the present invention was developed for use in a gas turbine engine, certain applications may be outside of this field.

In gas turbine engines, cooling air is generally bled off at various stages within the compressor and used for cooling elsewhere in the engine. As pressures and temperatures increase within gas turbine compressors, the temperature of the cooling air increases to a point where its usefulness as a cooling agent becomes minimal. Heat exchangers located outside the flow path of the gas turbine engine require complex piping and, therefore, introduce additional weight as well as pressure loses inefficiencies. Some studies placing heat exchangers within gas turbine engines have been undertaken and show promising results.

In FIG. 1 there is illustrated a prior art configuration of an internal heat exchanger. The cooling fluid enters heat exchanger 10 through inlet manifold 12, flows through thin-walled tubing 13, and exits heat exchanger 10 through outlet manifold 14. Airflow 16 passes over cooling tubes 13 and the cooling fluid within tubes 13 absorbs heat from airflow 16. The design of such prior art heat exchangers is costly due to the intensive assembly that requires multiple braze joints 18 to attach cooling tubes 13 to manifolds 12 and 14.

SUMMARY OF THE INVENTION

The invention described herein provides cooling means for reducing the cooling air bled off from the compressor of a gas turbine engine.

One form of the present invention contemplates a heat exchanger having an internal passageway and being disposed within the fluid flow path prior to the combustor so that the cooling air from the compressor is cooled as it flows over the outer surface of the heat exchanger.

In another embodiment of the invention, the heat exchanger is of an integral cast configuration and has a serpentine internal passageway. Eliminating the need for multiple-braze joint reduces the cost of such a cast heat exchanger.

The cooling medium flowing within the internal passageway of the heat exchanger can be fuel which cools the compressed air that is generally bled off from the compressor. The vaporized fuel is then supplied to the combustor of the gas turbine engine.

Furthermore, a series of heat exchanger segments can be arranged axially, thereby eliminating the need for separate individual heat exchangers of varying lengths.

One object of the present invention is to provide a unique heat exchanger.

Related objects and advantages of the present invention will be apparent from the following description.

DESCRIPTION OF THE PREFERRED EMBODIMENTS

Figure 1:
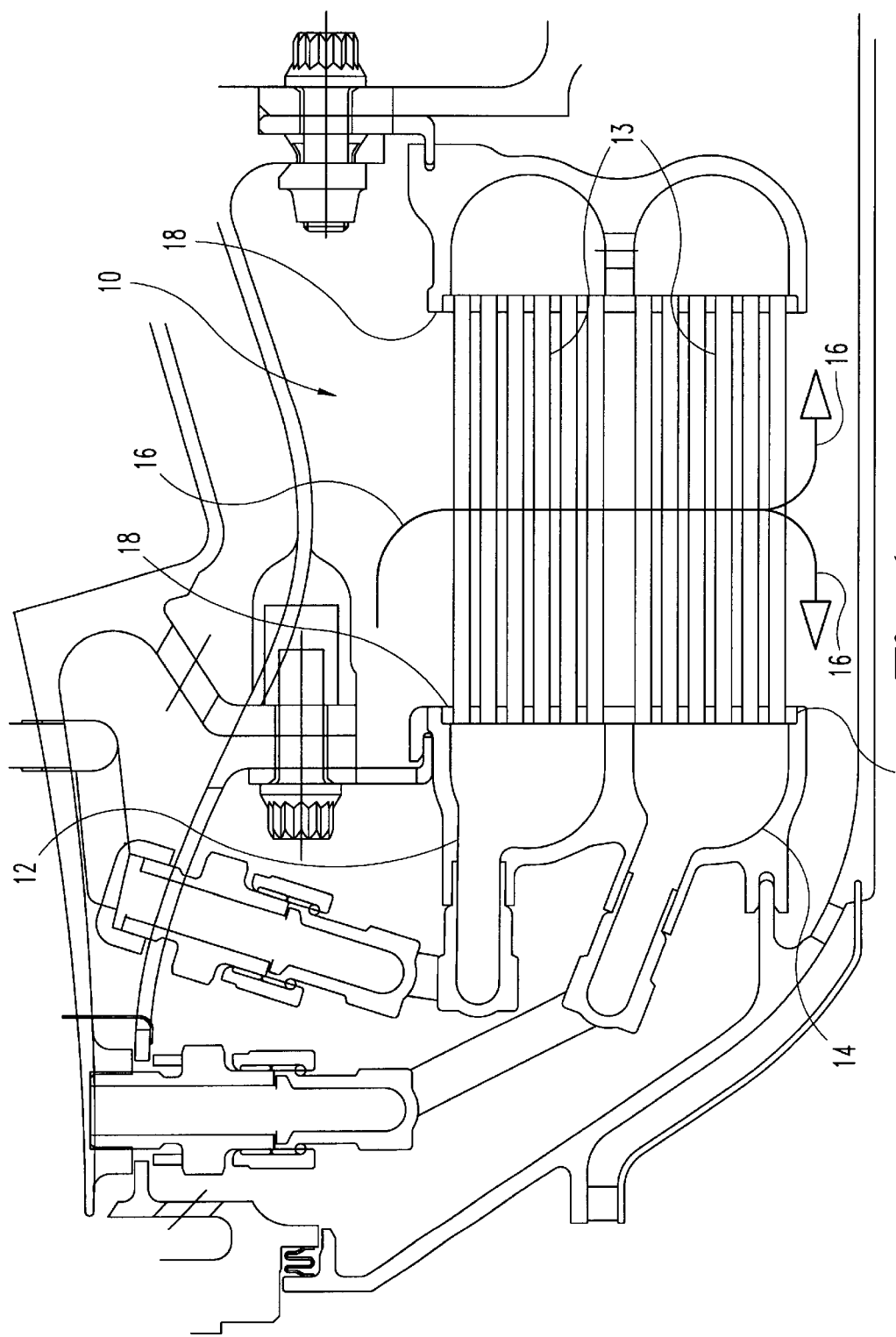
FIG. 1 is an illustrative cross-sectional view of a prior art internal heat exchanger.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
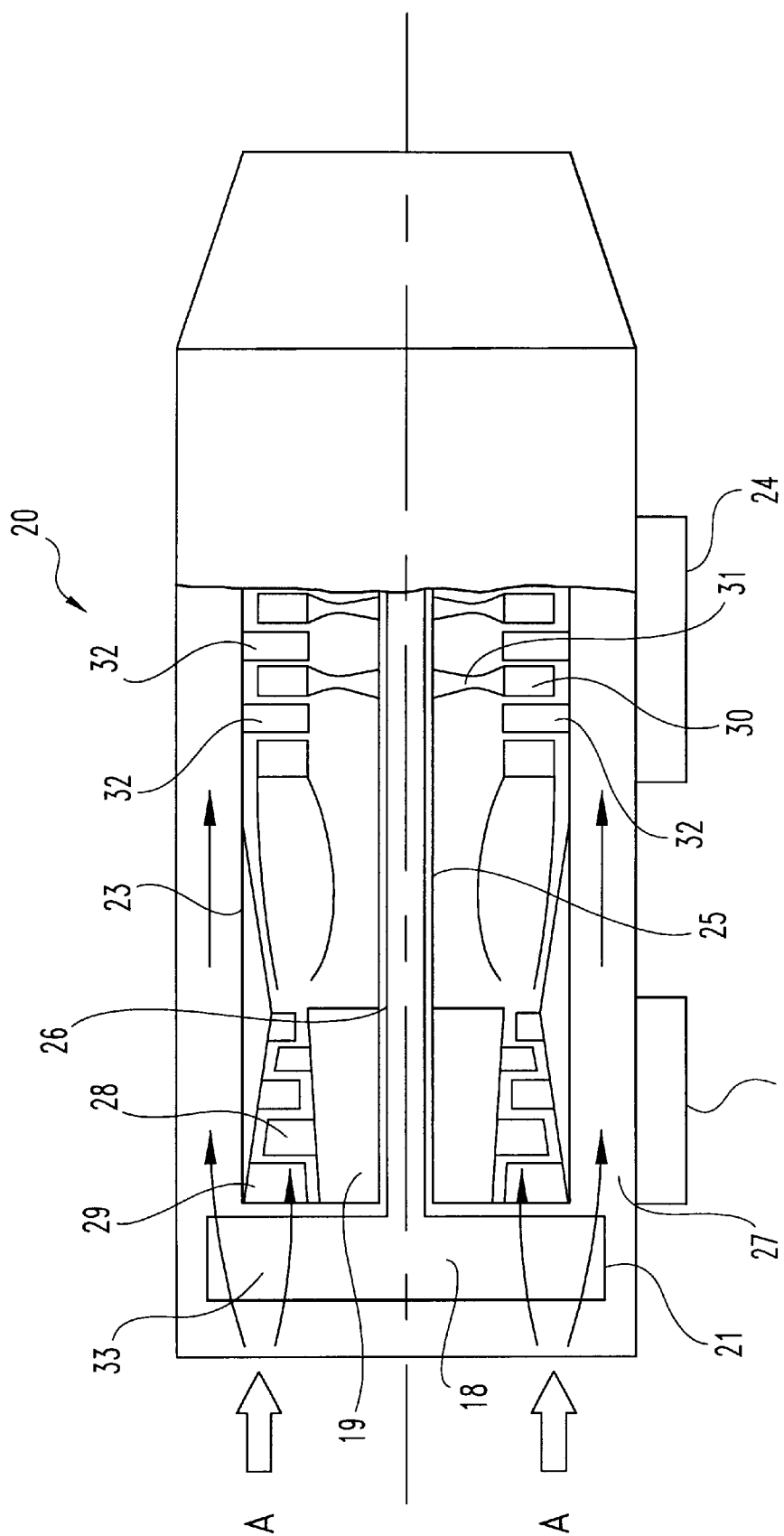
FIG. 2 is a schematic of a gas turbine engine.

Referring to FIG. 2, there is illustrated a gas turbine engine 20 which includes a fan section 21, a compressor section 22, a combustor section 23, and a turbine section 24 that are integrated together to produce an aircraft flight propulsion engine. This type of gas turbine engine is generally referred to as a turbo-fan. One alternate form of a gas turbine engine includes a compressor, a combustor, and a turbine that have been integrated together to produce an aircraft flight propulsion engine without the fan section. The term aircraft is generic and includes helicopters, airplanes, missiles, unmanned space devices and any other substantially similar devices. It is important to realize that there are a multitude of ways in which the gas turbine engine components can be linked together. Additional compressors and turbines could be added with intercoolers connecting between the compressors and reheat combustion chambers could be added between the turbines.

A gas turbine engine is equally suited to be used for an industrial application. Historically, there has been widespread application of industrial gas turbine engines, such as pumping sets for gas and oil transmission lines, electricity generation, and naval propulsion.

The compressor section 22 includes a rotor 19 having a plurality of compressor blades 28 coupled thereto. The rotor 19 is affixed to a shaft 25 that is rotatable within the gas turbine engine 20. A plurality of compressor vanes 29 are positioned within the compressor section 22 to direct the fluid flow relative to blades 28. Turbine section 24 includes a plurality of turbine blade 30 that are coupled to rotor disk 31. The rotor disk 31 is affixed to shaft 25, which is rotatable within the gas turbine engine 20. Energy extracted in the turbine section 24 form the hot gas exiting the combustor section 23 is transmitted through shaft 25 to drive the compressor section 22. Further, a plurality of turbine vanes 32 are positioned within the turbine section 24 to direct the hot gaseous flow stream exiting the combustor section 23.

The turbine section 24 provides power to a fan shaft 26, which drives the fan section 21. The fan section 21 includes a fan 18 having a plurality of fan blades 33. Air enters the gas turbine engine 20 in the direction of arrows A and passes through the fan section 21 into the compressor section 22 and a bypass duct 27. Further details related to the principles and components of a conventional gas turbine engine will not be described herein as they are believed known to one of ordinary skill in the art.

Figure 3:
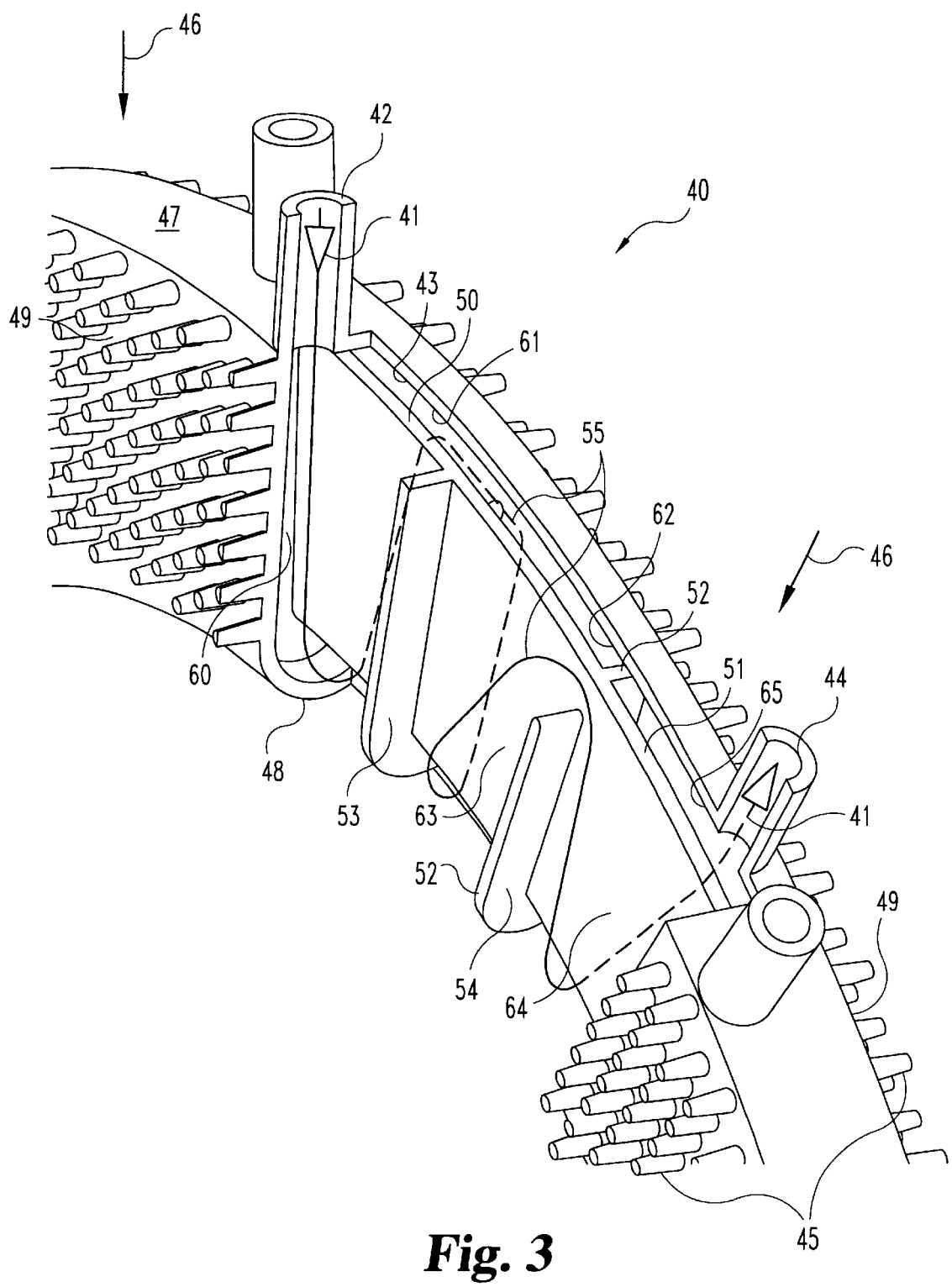
FIG. 3 is a perspective view of a segment of a heat exchanger according to one embodiment of the present invention.

In FIG. 3 there is illustrated a segment of the cooling system according to one embodiment of the present invention. As will be appreciated by the reader a portion of the heat exchanger has been removed to show the internal fluid flow path. The cooling system comprises at least one heat exchanger segment 40 disposed within a flow path 46 of air bled from the compressor of a gas turbine engine. In one embodiment, the air bled from the compressor is hot in a relative sense and the cooling system is designed to reduce the temperature of the air.

Heat exchanger 40 is preferably a single cast structure having inlet port 42, outlet port 44, and internal passage 43 located therebetween. Cooling medium 41 enters heat exchanger 40 through inlet port 42, flows through internal passage 43, and exits heat exchanger 40 through outlet port 44. The cooling medium may be any suitable fluid, but in the preferred embodiment, the cooling medium is fuel. The cold liquefied fuel is heated in the process of cooling the hot compressed air, and the resulting high temperature fuel is then supplied to the combustor of the gas turbine engine. The ports 42 and 44 are designed to have a fluid flow passageway coupled thereto, and in one embodiment are tapped for a threaded fitting and in another embodiment are prepared to have fittings brazed thereto. Also, ports 42 and 44 may be laid over at different angles as required for appropriate fuel line connections to the gas turbine engine.

Heat exchanger segment 40 includes front wall 47, back wall 48, and sides 49 connecting front and back walls 47 and 48. The inner surfaces of walls 47 and 48 and of sides 49 define internal passage 43. In one embodiment, the outer surface of sides 49 is covered with fins 45. Although fins 45 may be any type of fin configuration that transfers heat away from hot compressed air flow 46 and into cool fuel 41, pin fins, as illustrated in FIG. 3, are preferred because they have a higher heat transfer coefficient than other conventional fin configurations.

Disposed within internal passage 43 of heat exchanger 40 is internal wall structure 50 which comprises circumferential wall segment 51 and a plurality of radial wall segments 52. Circumferential wall segment 51 connects to front wall 47, but not back wall 48, of heat exchanger segment 40. Radial wall segments 52 extend radially from circumferential wall segment 51 and connect to a side 49 as well as back wall 48. The plurality of radial wall segments 52 further comprise a plurality of high walls 53 that connect to front wall 47 and a plurality of low walls 54 that terminate short of connecting to front wall 47.

Internal wall structure 50 thus creates a series of interconnected chambers 60, 61, 62, 63, 64, and 65 within internal passage 43 that route the fuel from inlet port 42 along serpentine path 55 to outlet port 44. In the preferred embodiment, serpentine path 55 makes multiple traverses of internal passage 43 of heat exchanger 40 in the axial direction (i.e., between front and back walls 47 and 48) and in the radial direction (i.e., between sides 49). Serpentine path 55 also circumferentially traverses internal passage 43 of heat exchanger 40. However, heat exchangers having other internal flow path configurations are contemplated herein.

Heat exchanger 40 can, but need not necessarily, be a complete 360 degree annular ring; instead, it can be a portion of a full ring unit. Multiple heat exchanger segments 40 can be located about the centerline of a gas turbine engine to yield a full ring unit if desired. Since heat exchanger 40 is cooled by fuel flow within internal passage 43, it need not necessarily be made from a high temperature alloy. It is preferably made from a material that has a high heat transfer coefficient such as beryllium copper or aluminum.

Figure 4:
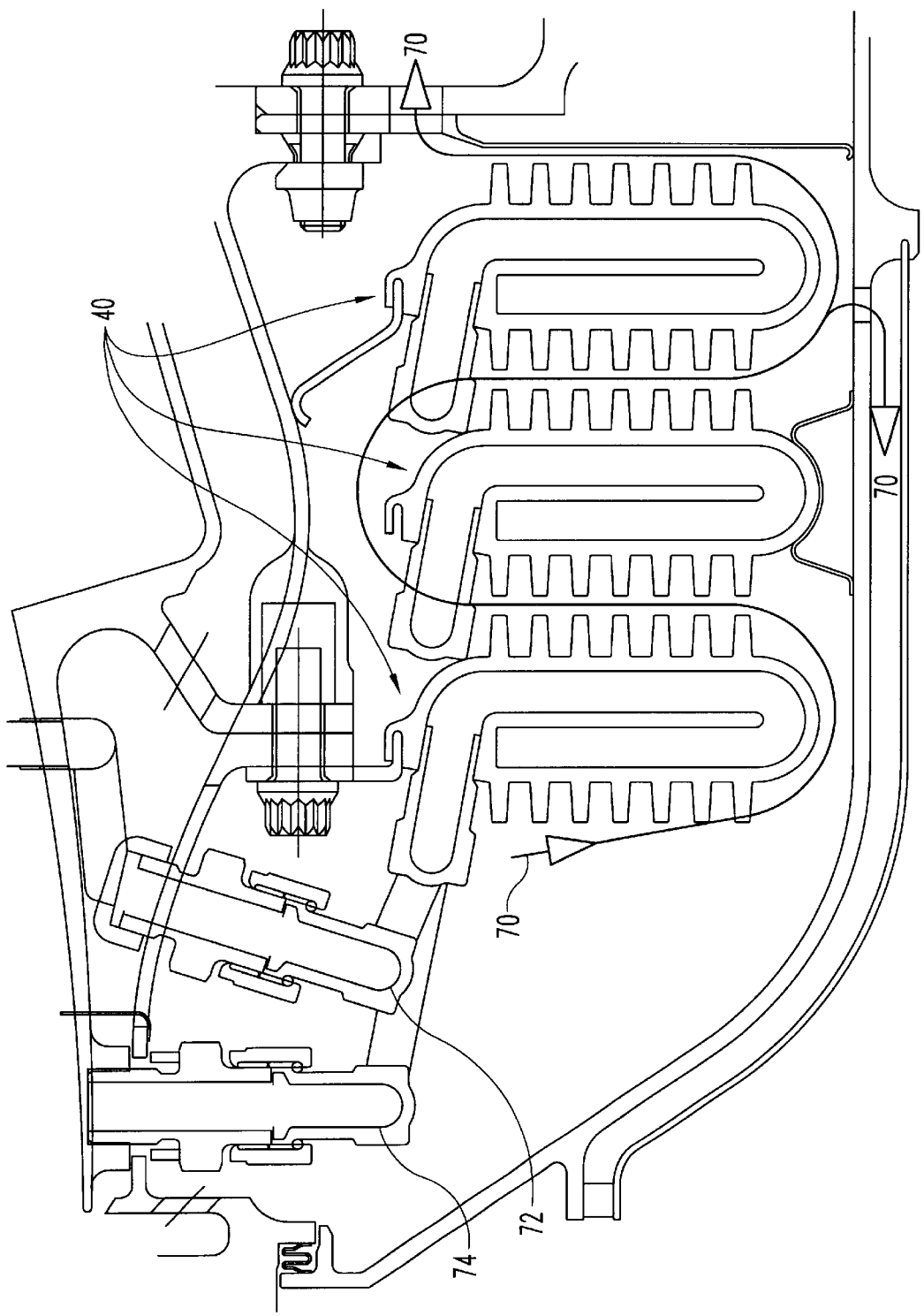
FIG. 4 is a cross-sectional view of heat exchangers according to the present invention connected in series.

A series of exchanger segments 40 can also be placed in series axially as illustrated in FIG. 4. Air flows along path 70 over the series of heat exchangers 40. The fluid inlets and outlets of heat exchangers 40 are rolled over for a more compact design and connected to inlet manifold 72 and outlet manifold 74, respectively. Although FIG. 4 shows three heat exchanger segments connected in series axially, it should be understood that any number of such heat exchanger segments can be serially connected to accommodate specific cooling requirements and engine length.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
   a gas turbine engine having a compressor section and a combustor section;
   a cast housing located within said combustor section and having an outer surface within and in a heat transfer relationship with a flow of a compressed air from said compressor section, said cast housing having an inlet and an outlet, said cast housing defining an internal passage between said inlet and outlet; and
   said housing further including a wall structure disposed within said internal passage to define a serpentine path from said inlet to said outlet.

2. The apparatus of claim 1, wherein said outer surface includes a plurality of heat transfer pedestals.

3. The apparatus of claim 2, wherein said plurality of heat transfer pedestals are defined by a plurality of pin fins.

4. The apparatus of claim 1, wherein said housing has a partial annular configuration.

5. The apparatus of claim 4, wherein said wall structure comprises a circumferential wall and a plurality of radial walls to define a series of interconnected chambers disposed along said serpentine path.

6. The apparatus of claim 4, wherein said serpentine path circumferentially traverses said internal passage.

7. The apparatus of claim 1, wherein said internal passage is adapted to contain a cooling medium, and which further includes a cooling medium source disposed in fluid communication with said inlet.

8. The apparatus of claim 7, wherein said cooling medium is liquefied fuel.

9. The apparatus of claim 1, wherein said housing is cast from a material with a high heat transfer coefficient.

10. The apparatus of claim 1:
   wherein said housing has a partial annular shape and said outer surface has a plurality of heat transfer members integrally formed therewith;
   wherein said wall structure comprises a circumferential wall and a plurality of transversely extending walls to define a plurality of chambers disposed in flow communication along said serpentine path; and
   wherein said cast housing and said wall structure are integrally cast of a high heat transfer coefficient metallic material.

11. An apparatus comprising:
   a gas turbine engine having a compressor portion, a combustor portion and a turbine portion;
   a cast heat exchanger within said gas turbine engine and having an outer surface disposed within and in a heat transfer relationship with a flow of air from said compressor portion, said heat exchanger having a cooling media inlet and a cooling media outlet, and defining therebetween an internal passage adapted to contain a cooling media; and
   said heat exchanger further including means for flowing said cooling media in a serpentine path through said internal passage.

12. The apparatus of claim 11, wherein said heat exchanger includes a plurality of heat transfer members on said outer surface of said heat exchanger that are adapted to transfer heat from said flow of air from said compressor and into said cooling media.

13. The apparatus of claim 12, wherein said plurality of heat transfer members are integrally cast with said heat exchanger and extend from said outer surface of said heat exchanger, and wherein said plurality of heat transfer members are defined by a plurality of pin fins.

14. The apparatus of claim 11, wherein said heat exchanger has a partial annular configuration.

15. The apparatus of claim 14, wherein said means for flowing said cooling media in a serpentine fluid flow path through said internal passage of said heat exchanger includes a wall structure defining a series of interconnected chambers disposed along said serpentine path, and wherein said wall structure is integrally cast with said heat exchanger.

16. The apparatus of claim 14, wherein said serpentine path circumferentially traverses said internal passage.

17. The apparatus of claim 11, further comprising a fuel supply in fluid communication with said cooling media inlet of said heat exchanger and wherein said cooling media is fuel.

18. The apparatus of claim 11, wherein said heat exchanger is cast from a material having a high heat transfer coefficient.

19. An apparatus, comprising:
   a gas turbine engine having a compressor and combustor;
   a plurality of cast heat exchangers placed in series axially within said gas turbine engine and disposed within a flow of air from said compressor, each heat exchanger including an inlet and an outlet and defining an internal passage therebetween, each heat exchanger further including means for flowing a cooling medium in a serpentine path through said internal passage, and wherein said internal passages are coupled in fluid communication with one another to define a pathway within said plurality of heat exchangers.

20. The apparatus of claim 19, wherein said cooling medium is fuel, said apparatus further comprising a fuel supply connected to one of said inlets of said heat exchangers and a fuel outlet manifold connected to one of said outlets of said heat exchangers, and wherein said fuel outlet manifold supplying fuel to said combustor.

21. The apparatus of claim 20, wherein said fuel supply is coupled to one end of said pathway and said fuel outlet manifold is coupled to the other end of said pathway.

* * * * *